US010046876B2

United States Patent
Aumann et al.

(10) Patent No.: US 10,046,876 B2
(45) Date of Patent: Aug. 14, 2018

(54) METHOD FOR TRANSFERRING ITEMS TO BE PACKAGED INTO CONTAINERS AND FOR TRANSPORTING THE FILLED CONTAINERS ONWARD

(71) Applicant: Uhlmann Pac-Systeme GmbH & Co. KG, Laupheim (DE)

(72) Inventors: Thomas Aumann, Mietingen (DE); Daniel Zieher, Ummendorf (DE); Wolfgang Rodi, Laupheim/Baustetten (DE); Fritz Fochler, Kammeltal-Behlingen (DE); Mathias Wegerer, Erolzheim-Edelbeuren (DE); Joerg Riekenbrauck, Schwendi (DE); Juergen Haaga, Rottenacker (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 470 days.

(21) Appl. No.: 14/970,057

(22) Filed: Dec. 15, 2015

(65) Prior Publication Data
US 2016/0176559 A1    Jun. 23, 2016

(30) Foreign Application Priority Data
Dec. 19, 2014    (EP) .................................... 14199112

(51) Int. Cl.
*B65B 35/20*    (2006.01)
*B65B 5/06*    (2006.01)
(Continued)

(52) U.S. Cl.
CPC ................ *B65B 35/20* (2013.01); *B65B 5/06* (2013.01); *B65B 35/405* (2013.01); *B65B 35/44* (2013.01);
(Continued)

(58) Field of Classification Search
CPC .. B65B 5/04; B65B 5/06; B65B 35/10; B65B 35/20; B65B 35/205; B65B 35/30;
(Continued)

(56) References Cited

U.S. PATENT DOCUMENTS 4,982,553 A  *  1/1991  Itoh .......................... B67B 7/02
                                                              53/251
5,343,671 A      9/1994  Tisma
(Continued)

FOREIGN PATENT DOCUMENTS

DE        4100769 A1    7/1991
DE       19860577 A1    7/2000
(Continued)

OTHER PUBLICATIONS

European Search Report for EP 14199112 dated Mar. 20, 2015.

Primary Examiner — Stephen F Gerrity
(74) Attorney, Agent, or Firm — Brinks Gilson & Lione

(57) ABSTRACT

In the method for transferring at least one item to be packaged into a container and for transporting the filled container onward the at least one item to be packaged is conveyed in a conveying direction to a transfer position by a linear motor transport device. The at least one item to be packaged is then moved from the transfer position to an intermediate storage area, which is arranged next to the transport device. A container is conveyed in the conveying direction to the transfer position by the linear motor transport device, and the at least one item to be packaged is moved back from the intermediate storage area to the transport device, thus filling the container. Afterwards, the filled container is moved onward in the conveying direction by the linear motor transport device.

12 Claims, 6 Drawing Sheets

(51) Int. Cl.
  *B65B 43/52* (2006.01)
  *B65B 35/40* (2006.01)
  *B65G 54/02* (2006.01)
  *B65B 65/02* (2006.01)
  *B65B 59/00* (2006.01)
  *B65B 35/44* (2006.01)

(52) U.S. Cl.
  CPC ............ *B65B 43/52* (2013.01); *B65B 59/005* (2013.01); *B65B 65/02* (2013.01); *B65G 54/02* (2013.01)

(58) Field of Classification Search
  CPC ....... B65B 35/40; B65B 35/405; B65B 43/42; B65B 43/48; B65B 43/52; B65B 65/003; B65B 54/02
  USPC ............................ 53/458, 473, 566, 249–252
  See application file for complete search history.

(56) References Cited

U.S. PATENT DOCUMENTS

| | | | |
|---|---|---|---|
| 6,811,024 B2 | 11/2004 | Wieduwilt et al. | |
| 2002/0148704 A1* | 10/2002 | Jager | B23Q 7/14 198/339.1 |
| 2003/0136086 A1 | 7/2003 | Kalany et al. | |
| 2005/0262802 A1* | 12/2005 | Natterer | B65B 35/24 53/147 |
| 2007/0227101 A1 | 10/2007 | Simm | |
| 2008/0219825 A1* | 9/2008 | Yoshida et al. | B65G 17/20 414/749.6 |
| 2011/0056900 A1* | 3/2011 | Inui et al. | H01L 21/67706 212/98 |
| 2012/0031737 A1* | 2/2012 | Felk et al. | B65B 43/52 198/604 |
| 2013/0105036 A1* | 5/2013 | Smith et al. | B65B 35/205 141/1 |
| 2013/0326997 A1 | 12/2013 | Rapp et al. | |
| 2014/0083817 A1* | 3/2014 | van de Loecht et al. | B65G 54/02 198/459.8 |
| 2015/0047295 A1* | 2/2015 | van de Loecht | B65B 35/205 53/235 |
| 2015/0118000 A1* | 4/2015 | Rodi et al. | B65B 43/52 414/751.1 |
| 2015/0158611 A1* | 6/2015 | Kalany et al. | B65B 5/06 53/443 |
| 2015/0321857 A1* | 11/2015 | Sacchetti et al. | B65B 35/405 198/419.2 |
| 2017/0225912 A1* | 8/2017 | Beppu et al. | B65G 54/02 |

FOREIGN PATENT DOCUMENTS

| | | | | |
|---|---|---|---|---|
| DE | 10123220 A1 | 11/2002 | | |
| DE | 102005017961 A1 | 10/2006 | | |
| EP | 1530541 A1 | 5/2005 | | |
| FR | 1215088 A * | 4/1960 | | B65B 5/04 |
| FR | 2378700 A1 * | 8/1978 | | B65G 54/02 |
| WO | WO 2013/156177 A1 | 10/2013 | | |

\* cited by examiner

METHOD FOR TRANSFERRING ITEMS TO BE PACKAGED INTO CONTAINERS AND FOR TRANSPORTING THE FILLED CONTAINERS ONWARD

RELATED APPLICATIONS

The present patent document claims the benefit of and priority to European Patent Application No. EP 14199112.5 filed Dec. 19, 2014, the entire contents of which are incorporated herein by reference.

FIELD AND BACKGROUND

The present disclosure relates to a method for transferring items to be packaged, especially blister packs, into containers, especially folding boxes, and for transporting the filled containers onward.

In the pharmaceutical industry, sealed blister packs are often used to store medications. These blister packs contain a plurality of pockets, in which the pharmaceutical products such as sugar-coated pills or tablets are placed. After they have been produced, these blister packs are usually sent during the further course of the packaging process to a packaging station, in which the individual blister packs or stacks of blister packs are introduced into folding boxes.

To introduce the blister packs into the folding boxes, the blister packs are transported along a first route by means of a transport device, whereas the folding boxes are transported along a second route, parallel to the first route, by means of a conveying device comprising appropriately formed holders for the folding boxes. The first and second routes are laid out with respect to each other in such a way that, at least at certain times, the blister packs or stacks of blister packs are arranged next to an open side of their assigned folding boxes. At that point, the blister packs are pushed laterally into their assigned folding boxes. The folding boxes containing the blister packs are then carried onward by the folding box conveying device. During the time that the blister packs are being inserted into the folding boxes, the transport device and the conveying device are either stationary or moving onward, next to each other, at the same speed.

Transport devices are also known in which slides are moved independently of each other along a guide rail. This is realized in that the guide rail comprises a linear motor drive device for driving the slides, wherein each slide comprises at least one permanent magnet, which interacts with the linear motor drive device. A transport device with a linear motor drive of this type is known from, for example, WO 2013/156177 A1.

SUMMARY

The present disclosure provides a method for transferring items to be packaged into containers and for transporting the filled containers onward, that is especially space-saving and cost-saving.

According to an aspect of the disclosure, the method for transferring at least one item to be packaged into at least one container and for transporting the at least one filled container onward comprises the following steps:

providing a transport device with at least two slides, with a guide rail, along which the at least two slides can be moved, and with a linear motor drive device for driving the at least two slides, wherein each of the at least two slides comprises at least one permanent magnet, which interacts with the linear motor drive device;

conveying the at least one item to be packaged in a conveying direction to at least one transfer position by means of the transport device;

moving the at least one item to be packaged from the transfer position to at least one intermediate storage area, which is located next to the transport device;

conveying at least one container to the at least one transfer position by means of the transport device;

moving the at least one item to be packaged back from the at least one intermediate storage area to the transport device, thereby filling the at least one container with the at least one item to be packaged; and transporting the at least one filled container in the conveying direction by means of the transport device.

In this method, the initial transportation of the at least one item to be packaged, the initial transport of the at least one container and the transport of the at least one filled container onward are carried out with one and the same transport device. It is thus possible to omit a separate conveying device for transporting the filled container onward or for supplying empty containers. In addition to reducing the amount of space required, this also lowers costs.

The at least one item to be packaged and the at least one container are preferably transported in at least one first and at least one second product holding space of the transport device. This means that product holding spaces adaptable to the size and shape of the at least one item to be packaged and to the size and shape of the at least one container can be provided, and there is no need to make adjustments during ongoing operation.

It may be advantageous, furthermore, for each first product holding space for transporting the at least one item to be packaged to comprise a first length and for each second product holding space for transporting the at least one container to comprise a second length, which is greater than the first length. This measure takes into account the difference between the size of the items to be packaged and the size of the containers.

The at least one item to be packaged may be transported initially in the at least one first product holding space to the transfer position, and after the at least one item to be packaged has been moved into the at least one intermediate storage area, the at least one item to be packaged is moved into the at least one second product holding space and thus into the at least one container. The advantage of this sequence is that the at least tone item to be packaged is introduced into the at least one container while the at least one container is not moving. After the at least one item to be packaged has been introduced into the at least one container, the filled container is already on the transport device and can be transported onward immediately.

In one embodiment, each first product holding space is formed between two retaining elements, and each second product holding space is also formed between two retaining elements, so that the at least one item to be packaged and the at least one container are arranged and carried along stably in the first and second product holding spaces. As a result, it is possible to transport the items to be packaged and the containers reliably.

It may also be advantageous for the two retaining elements of each product holding space to be moved relative to each other by the interaction of the at least one permanent magnet with the linear motor drive device. Thus the movement of the retaining elements intended to change the length of the product holding space can be effectively controlled electronically. There is no need for any manual adjustment to the distance between the retaining elements.

In another embodiment, the transport device comprises at least one first, at least one second, and at least one third slide, wherein the retaining element of the second slide contributes both to the formation of the first product holding space and to the formation of the second product holding space. In this way, the items to be packaged and the containers can be effectively transported at high throughput.

The at least one first product holding space and the at least one second product holding space are preferably transported in groups. This increases the throughput of the method.

It may also be preferable for several first product holding spaces and several second product holding spaces to be provided in each group of product holding spaces, wherein first product holding spaces and second product holding spaces always alternate in the conveying direction. It is therefore possible during each transfer cycle to convey items to be packaged into the intermediate storage areas at certain transfer positions and simultaneously to convey items to be packaged from the intermediate storage areas into the containers at other transfer positions.

In this case, it may also be preferable for the number of first product holding spaces and the number of second product holding spaces in each group to be even. In this way, the slides can be moved to the transfer positions in exactly the same way during each circuit, which reduces the effort required to control them.

The at least one item to be packaged may be moved from the transport device to the at least one intermediate storage area by pushing the at least one item to be packaged in a first direction transverse to the conveying direction. It may also be preferable for the filling of the at least one container with the at least one item to be packaged to be accomplished by pushing the at least one item to be packaged into the at least one container in a second direction opposite to the first direction. Moving the at least one item to be packaged to the at least one intermediate storage area by pushing and filling the at least one container with the at least one item to be packaged by pushing it in means that the at least one item to be packaged can be transferred directly and with modest mechanical effort. The overall process thus also becomes faster.

DETAILED DESCRIPTION OF SPECIFIC EMBODIMENTS

The method according to the present disclosure for transferring items to be packaged into containers and for transporting the filled containers onward is described in greater detail in the following on the basis of the drawings. In the figures, the items to be packaged 2 are shown in the form of blister packs or stacks of blister packs. The containers 4, furthermore, are shown in the form of folding boxes. It should be obvious, however, that the items to be packaged 2 and the containers 4 are not limited to these concrete realizations.

Figure 1:
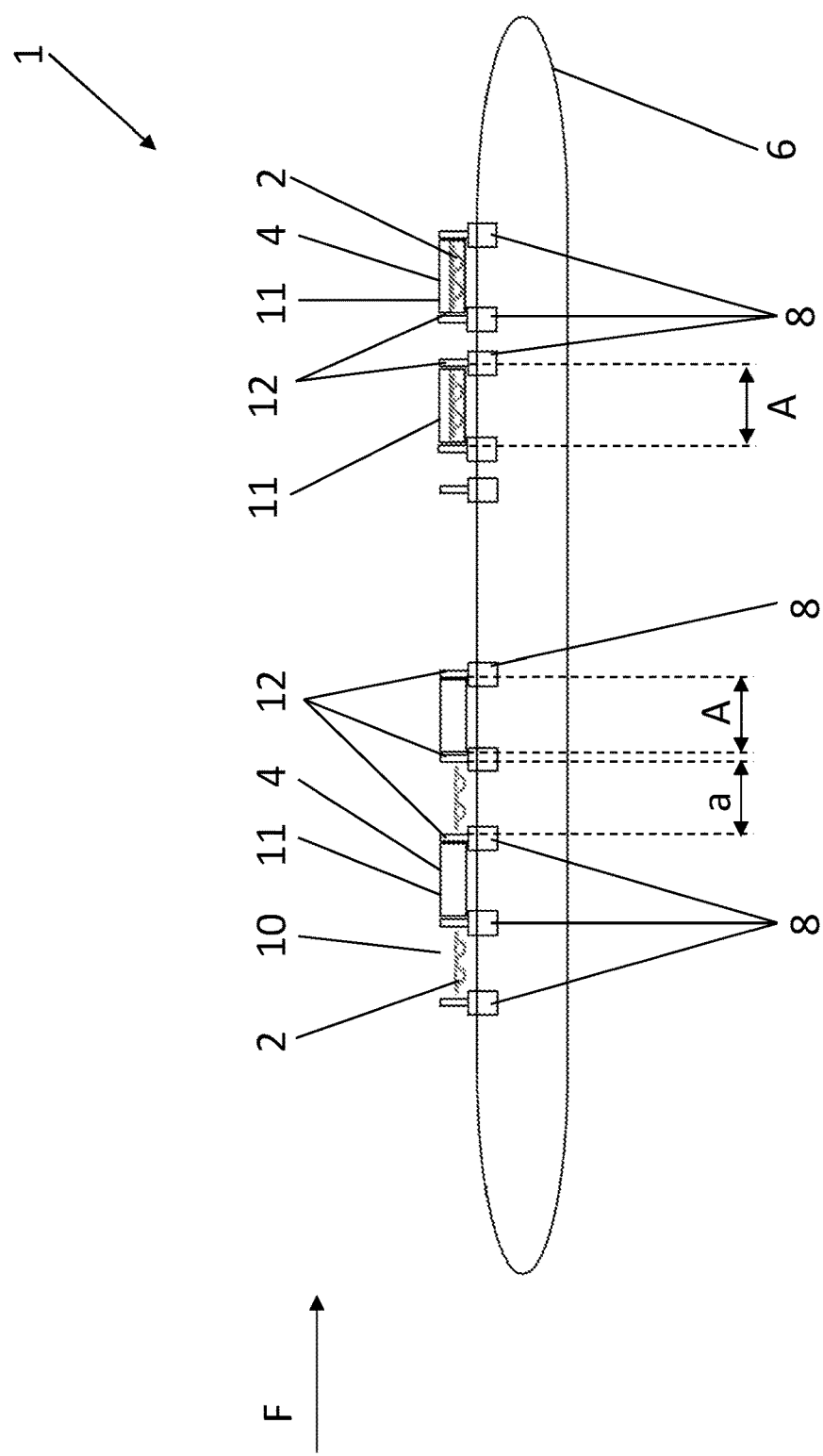
FIG. 1 shows a schematic side view of a transport device which can be used in the method according to the present disclosure.
Figure 2:
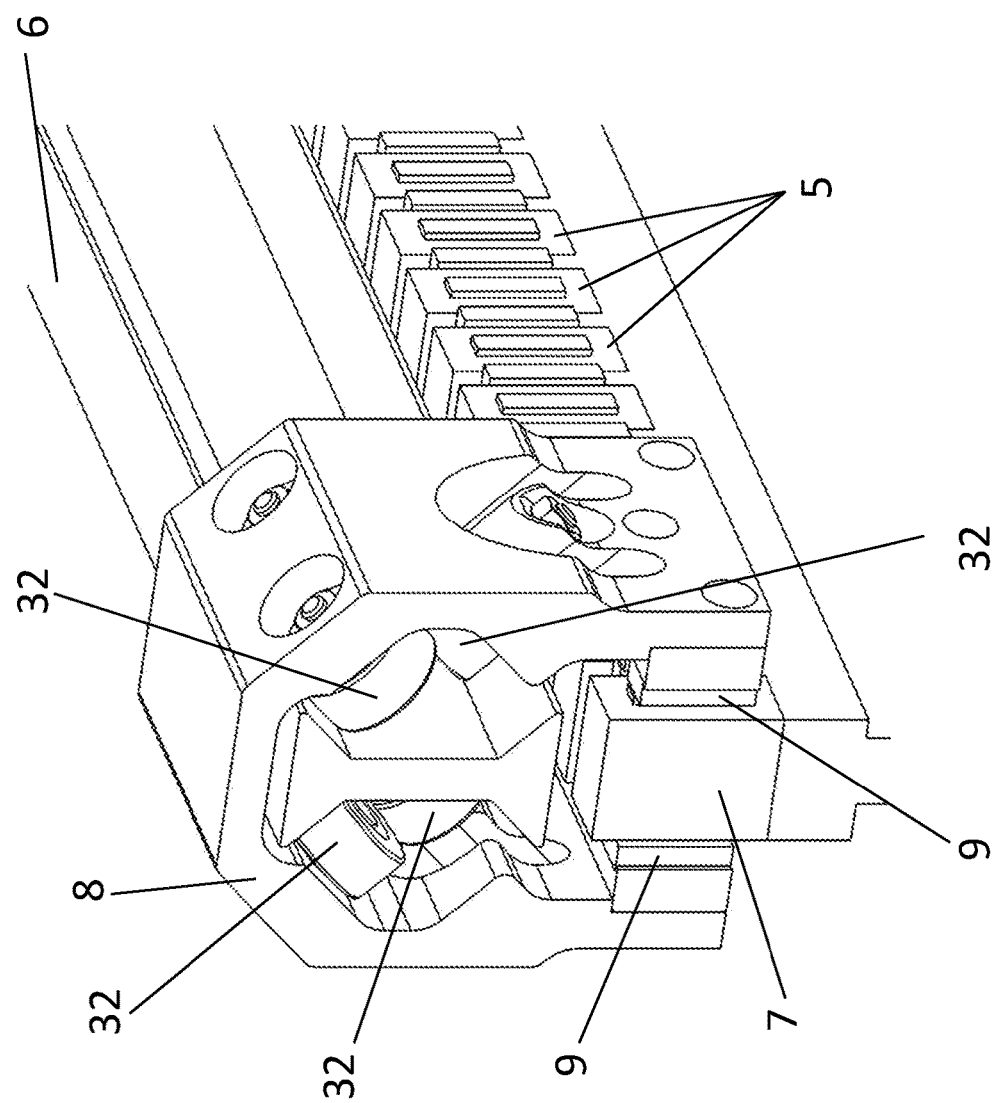
FIG. 2 shows a perspective view of a section of FIG. 1, which illustrates the general structure of the transport device.

FIG. 1 shows a side view of the structure of a transport device 1, which can be used to implement the method according to the present disclosure. FIG. 2 shows the basic structure of the transport device 1. The transport device 1 comprises a stationary, in particular an endless, guide rail 6 to guide at least two movable slides 8, preferably more than two slides 8, which are movable independently of each other. Although ten slides 8 are shown in the example of FIG. 1, fewer or more slides can be arranged simultaneously on the guide rail 6.

To drive the slides 8, a linear motor drive device 7 is used, which comprises a plurality of coils 5 arranged in a row, each of which can be provided with current individually. Each slide 8 in turn comprises at least one, preferably two, permanent magnets 9, which interact with the linear motor drive device 7. Accordingly, each slide 8 can be put into motion individually along the guide rail 6. As FIG. 2 shows, the slides 8 are supported and guided along the guide rail 6 by a plurality of rollers 32. There are many different ways of laying out the structure of the slides 8 and their support on the guide rail 6.

The conveying direction F of the items to be packaged 2 in the transport device 1 is preferably straight, as indicated in FIG. 1 by the arrow. The conveying direction F of the items to be packaged 2 can also be variable, however, that is, it can also pass around curves. The conveying direction F can also be opposite to the conveying direction of FIG. 1.

In the example of FIG. 1, the endless guide rail 6 has the form of an elongated oval. The slides 8 move around the entire guide rail 6 until they reach their starting positions again. The long, straight upper section of the guide rail 6 extends in the conveying direction F and forms the part of the transport device 1 in which the items to be packaged and the containers 4 are conveyed.

In FIG. 1, the slides 8 are arranged on the upper section of the guide rail 6 one behind the other in the conveying direction F. The five slides 8 on the left are combined into one group of slides 8, and the five slides 8 on the right are combined into a second group. Two first product holding spaces 10 are assigned to the slides 8 in the left group. Items to be packaged 2 can be transported in these first product holding spaces 10. Two second product holding spaces 11 are also assigned to each of the two groups of slides 8, in each of which second product holding spaces 11 an empty container 4 or a container 4 filled with at least one item 2 can be transported. The first and second product holding spaces 10, 11 alternate with each other along the guide rail 6.

Each first product holding space 10 and each second product holding space 11 are normally limited by two retaining elements 12, namely, a retaining element 12 in the front with respect to the conveying direction F and a retaining element 12 in the rear with respect to the conveying direction F. In the case of FIG. 1, the four product holding spaces 10, 11 are each limited by five retaining elements 12 per group, wherein two adjacent retaining elements 12 limit one product holding space 10, 11 in each case.

In the example of FIG. 1, each slide 8 comprises precisely one retaining element 12, so that each product holding space 10, 11 is defined by the two retaining elements 12 of two adjacent slides 8.

All of the slides 8 of a group of slides 8 are moved in exactly the same way during the transport of the items to be packaged 2 and of the containers 4, so that the items to be packaged 2 and the empty containers 4 are held in the first and second product holding spaces 10, 11, respectively, in which they are preferably subjected to a small amount of pressure by the retaining elements 12.

The group of slides 8 on the left in FIG. 1 is transporting items to be packaged 2 in two product holding spaces 10, and an empty container is being transported in each of two product holding spaces 11. The group of slides 8 on the right in FIG. 1 is transporting two filled containers 4. When transporting at least one item to be packaged 2, each first product holding space 10 usually has a first length a, and each second product holding space 11, when transporting an empty or a filled container 4, has a second length A, which is greater than the first length a. In the embodiment of FIG. 1, this means that, as the slides 8 of each group move along, the distance separating adjacent pairs alternates between narrower and wider gaps.

The intermediate steps involved in the filling of the containers 4 with the items to be packaged 2 are explained in greater detail below with reference to FIGS. 6A and 6B.

In the following, the individual phases of specific embodiments of the method according to the invention are explained in greater detail on the basis of FIGS. 3-6.

FIGS. 3A-3D are schematic views from above of a transport device 1 with a guide rail 6 and two retaining elements 12. The diagrams illustrate four phases of an embodiment of the method according to the present disclosure. For the sake of clarity, the slides 8, to which the retaining elements 12 are assigned, are not shown. In addition, FIGS. 3A-3D also show an intermediate storage area 14, which is arranged next to a transfer position 15 of the transport device 1.

In the first phase, a first product holding space 10, limited by the two retaining elements 12, is located in the transfer position 15. The first product holding space 10 is supplied with at least one item to be packaged 2 and is arranged next to the intermediate storage area 14 in a direction transverse to the conveying direction F.

Figure 3A:
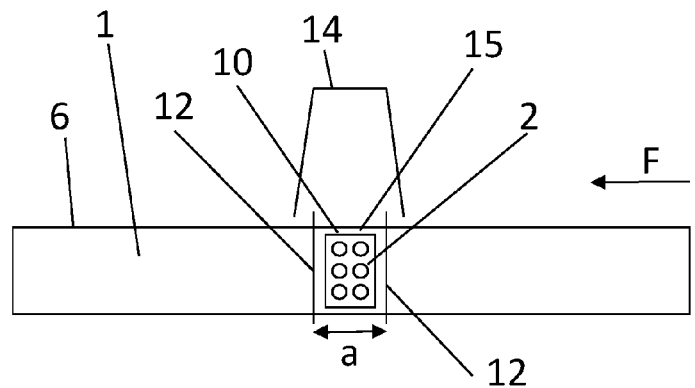
FIGS. 3A-3D are schematic views from above of a transport device, in which four phases of an exemplary embodiment of the method according to the present disclosure are illustrated.
Figure 3B:
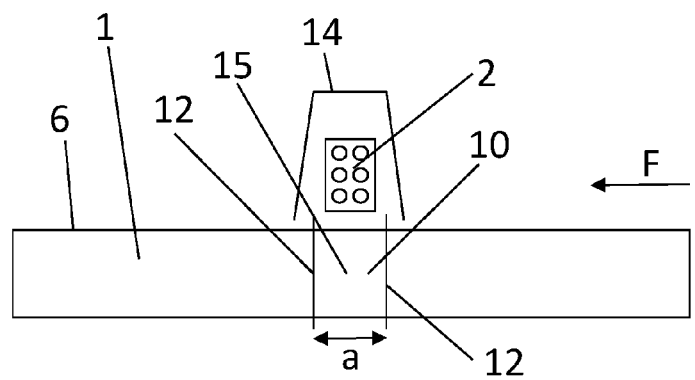

In the second phase in FIG. 3B, which proceeds from the diagram of FIG. 3A, the at least one item to be packaged 2 has been moved into the intermediate storage area 14 in a direction transverse to the conveying direction F.

Figure 3C:
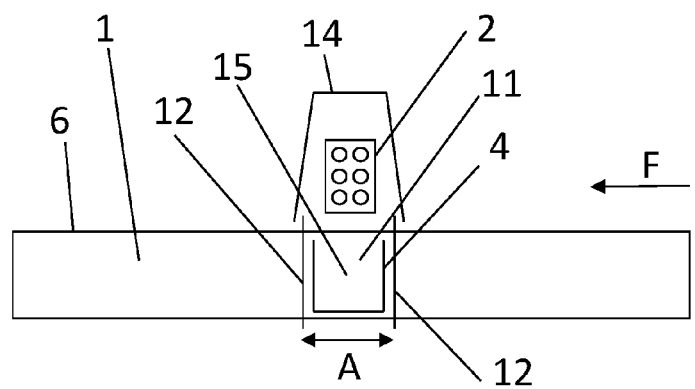

In the third phase in FIG. 3C, which proceeds from the FIG. 3B, the first, emptied product holding space 10 has been moved onward. A second product holding space 11, which is limited by two retaining elements 12 and supplied with an empty container 4, has also been moved in the conveying direction F to the transfer position 15 by the transport device 1. The second product holding space 11 has a greater length A than the length a of the first product holding space 10. The open side of the container 4 is facing the at least one item to be packaged 2 in the intermediate storage area 14.

Figure 3D:
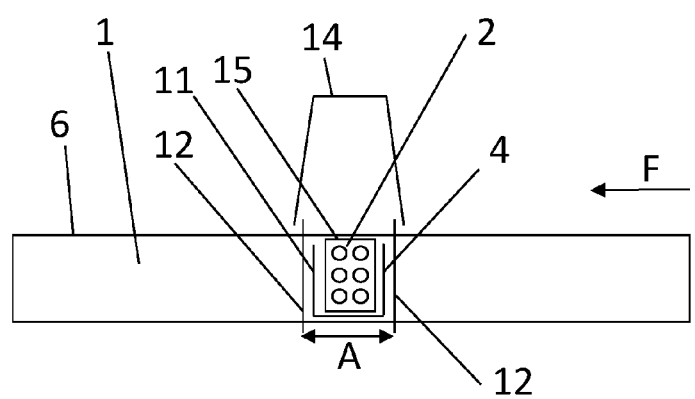

In the fourth phase, shown in FIG. 3D, which proceeds from FIG. 3C, the at least one item to be packaged 2 has been moved transversely to the conveying direction F from the intermediate storage area 14 back to the transport device 1, the container 4 thus becoming filled with the item 2. Proceeding from FIG. 3D, the filled container 4 can now be transported onward in the conveying direction F by the transport device 1.

The retaining elements 12 in FIGS. 3A-3D consist of two separate pairs of retaining elements 12, wherein a first pair of retaining elements 12 defines the first product holding space 10 in FIGS. 3A and 3B, and the second pair of retaining elements 12 defines the second product holding space 11 in FIGS. 3C and 3D.

FIGS. 4A-4D are schematic views from above of a transport device 1 with a guide rail 6 and retaining elements 12. The diagrams illustrate four phases of another exemplary embodiment of the method according to the invention. For the sake of clarity, the slides 8 to which the retaining elements 12 are assigned are not shown. FIGS. 4A-4D also show an intermediate storage area 14, which is located next to the transfer position 15 of the transport device 1.

FIGS. 4A-4D show a first and a second product holding space 10, 11, each of which is limited by two retaining elements 12 belong to a group of three retaining elements 12. Assigned to the group of retaining elements 12 are a first product holding space 10 for transporting the at least one item to be packaged 2 and a second product holding space 11 for transporting a container 4. The first product holding space 10 comprises a first length a, and the second product holding space 11 comprises a second length A, which is greater than the first length.

Figure 4A:
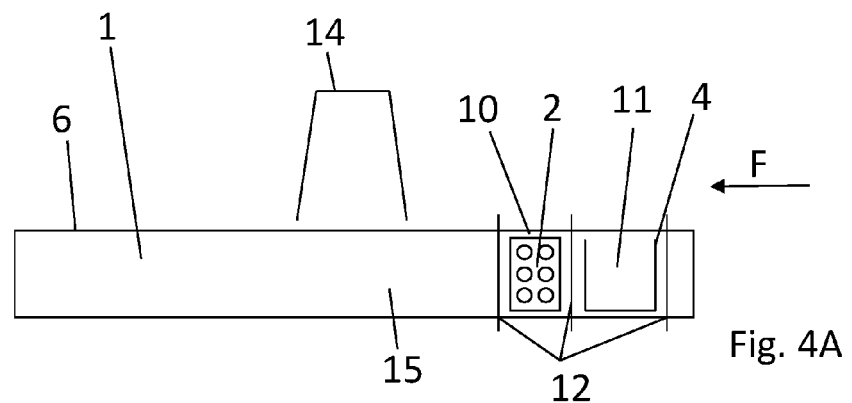
FIGS. 4A-4D are schematic views from above of a transport device, in which four phases of another exemplary embodiment of the method according to the present disclosure are illustrated.

In the first phase, shown in FIG. 4A, at least one item to be packaged 2 is being conveyed in the first product holding space 10 in the transport direction F of the transport device, and simultaneously an empty container 4 is being conveyed in the second product holding space 11 in the conveying direction F.

Figure 4B:
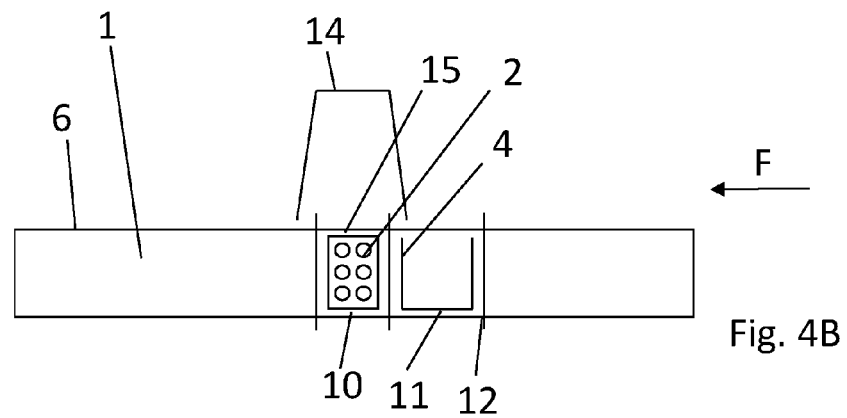

In the second phase, shown in FIG. 4B, which proceeds from FIG. 4A, the first product holding space 10 with the at least one item to be packaged 2 has been moved to the transfer position 15. The product holding space 10 arranged in the transfer position 15 is located next to the intermediate storage area 14 in a direction transverse to the conveying direction F.

Figure 4C:
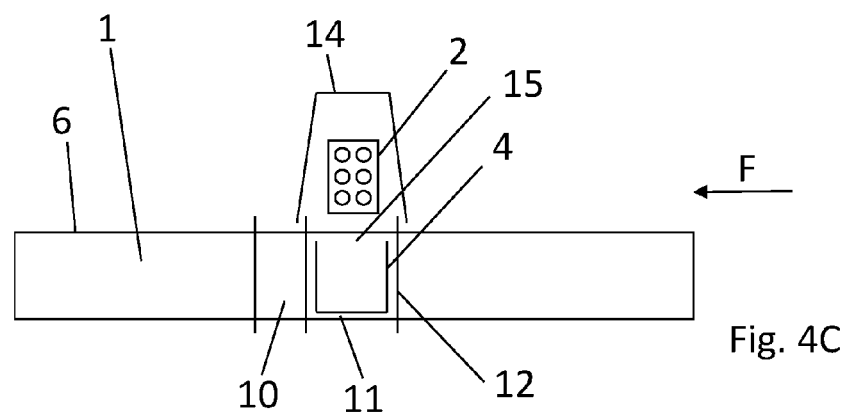

In FIG. 4C, which proceeds from FIG. 4B, the at least one item to be packaged 2 has been moved from the first product holding space 10 in a first direction transverse to the conveying direction F into the intermediate storage area 14. In addition, the second product holding space 11 with the empty container 4 has been moved into the transfer position 15. The product holding space 11 arranged in the transfer position 15 is located next to the intermediate storage area 14, wherein the open side of the container 4 is facing the at least one item to be packaged 2 arranged in the intermediate storage area 14.

Figure 4D:
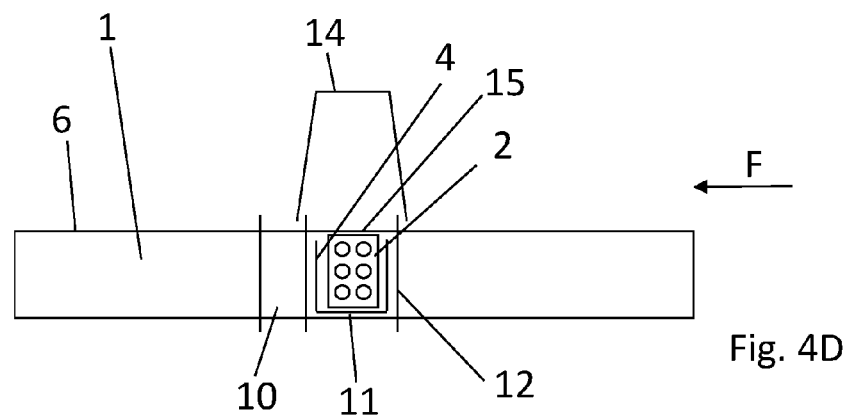

In FIG. 4D, which proceeds from FIG. 4C, the at least one item to be packaged 2 has been moved from the intermediate storage area 14 back to the transport device 1, in which the container 4 is located. The container 4 is thus filled with the at least one item to be packaged 2. In a further phase, the filled container 4 can now be transported onward in conveying direction F by the transport device 1.

What sets the embodiment of FIGS. 4A-4D apart from the embodiment of FIGS. 3A-3D is thus that the product holding spaces 10, 11 are arranged in a row and the associated slides 8 are moved jointly as a group.

FIGS. 5A-5D are schematic views from above of a transport device 1 with a guide rail 6 and retaining elements 12. The diagrams illustrate four phases of another exemplary embodiment of the method according to the present disclosure. For the sake of clarity, the slides 8 to which the retaining elements 12 are assigned are not shown. In FIGS. 5A-5D, furthermore, two intermediate storage areas 14, arranged one behind the other in the conveying direction F, are also provided.

Figure 5A:
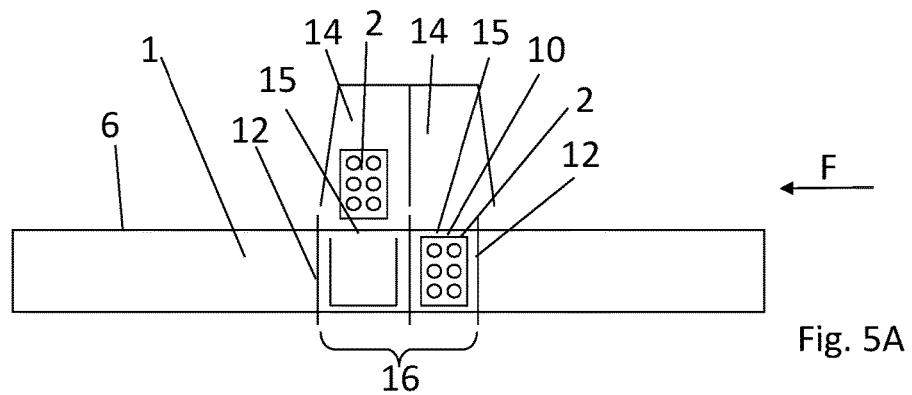
FIGS. 5A-5D are schematic views from above of a transport device in which four phases of another exemplary embodiment of the method according to the present disclosure are illustrated.

In FIGS. 5A-5D, a first group 16 and a second group 18 of product holding spaces 10, 11 are shown, each of which is formed out of three retaining elements 12. A first product holding space 10 for transporting the at least one item to be packaged 2 and a second product holding space 11 for transporting a container 4 are assigned to each group 16, 18. The first product holding space 10 has a first length a, and the second product holding space 11 has a second length A, which is greater than the first length. In FIG. 5A, the second product holding space 11 of the first group 16 is arranged upstream of the first product holding space 10 with respect to the conveying direction F.

In the first phase, shown in FIG. 5A, at least one item to be packaged 2 is already present in the intermediate storage area 14 in the upstream position relative to the conveying direction F. This at least one item 2 originates from an earlier transfer cycle. The second product holding space 11 of the first group 16 is arranged in a transfer position 15, next to the forward intermediate storage area 14. An empty container 4 is present in the second product holding space 11. The open side of this container 4 is facing the at least one item to be packaged 2 in the forward intermediate storage area 14. A first product holding space 10 of the first group 16, supplied with at least one item to be packaged 2, furthermore, is arranged in another transfer position 15, next to the rear intermediate storage area 14.

Figure 5B:
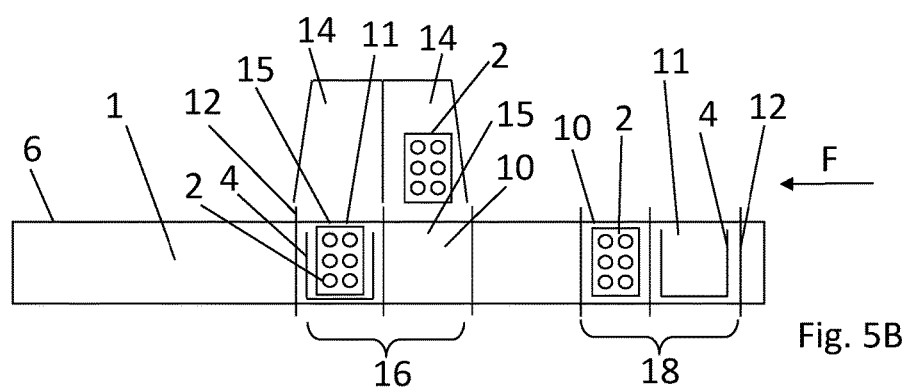

In the second phase, shown in FIG. 5B, which proceeds from the diagram of FIG. 5A, the at least one item to be packaged 2 has been moved from the forward intermediate storage area 14 in a second direction transverse to the conveying direction F into the container 4 in the second product holding space 11, and the at least one item to be packaged 2 in the first product holding space 10 has been moved in a first direction transverse to the conveying direction F, opposite to the second direction, into the rear intermediate storage area 14.

As can also be seen in FIG. 5B, a first product holding space 10 and a second product holding space 11 of a second group 18 are being moved up by the transport device 1 in the conveying direction F. The first product holding space 10 is supplied with at least one item to be packaged 2, and the second product holding space 11 is supplied with an empty container 4. The first product holding space 10 here is arranged upstream of the second product holding space 11 relative to the conveying direction F.

Figure 5C:
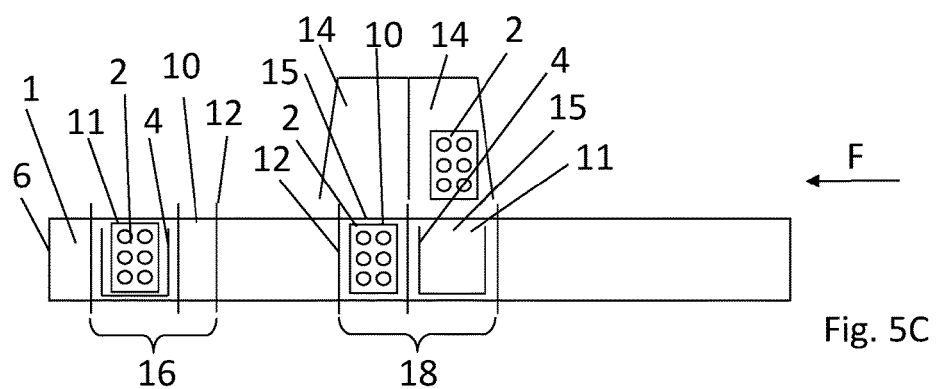

In FIG. 5C, which proceeds from FIG. 5B, the first and second product holding spaces 10, 11 of the first group 16 have been moved onward in the conveying direction F to transport the filled container 4 present in the second product holding space 11 onward. In addition, the first and second product holding spaces 10, 11 of the second group 18 have been moved onward in the conveying direction F and arranged in the transfer positions 15, next to the forward and the rear intermediate storage areas 14. The empty container 4 in the second product holding space 11 is arranged next to the at least one item to be packaged 2 in the rear intermediate storage area 14.

Figure 5D:
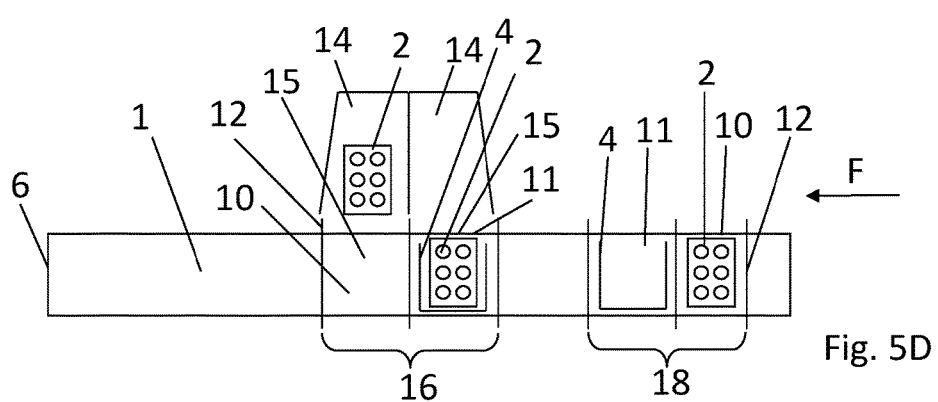

In FIG. 5D, which proceeds from FIG. 5C, the at least one item to be packaged 2 has been moved from the rear intermediate storage area 14 in the second direction, transverse to the conveying direction F, into the container 4 in the second product holding space 11. In addition, the at least one item to be packaged 2 has been moved from the first product holding space 10 in the first direction, transverse to the conveying direction F, opposite to the second direction, into the forward intermediate storage area 14. A first product holding space 10 and a second product holding space 11 of another group, furthermore, have again been moved up in the conveying direction F. The other group can be the first group 16 again, or it can be an additional group. In either case, the order of product holding spaces 10, 11 of the other group is the same as that of the first group 16. In principle, any number of groups can be selected.

In another phase, not shown, the first and second product holding spaces 10, 11 of the second group 18 can be moved onward in the conveying direction F, and the first and second product holding spaces 10, 11 of the other group can be moved in the conveying direction F up to the transfer positions 15, so that we arrive again at the diagram of FIG. 5A. Thus one transfer cycle has been completed.

Figure 6A:
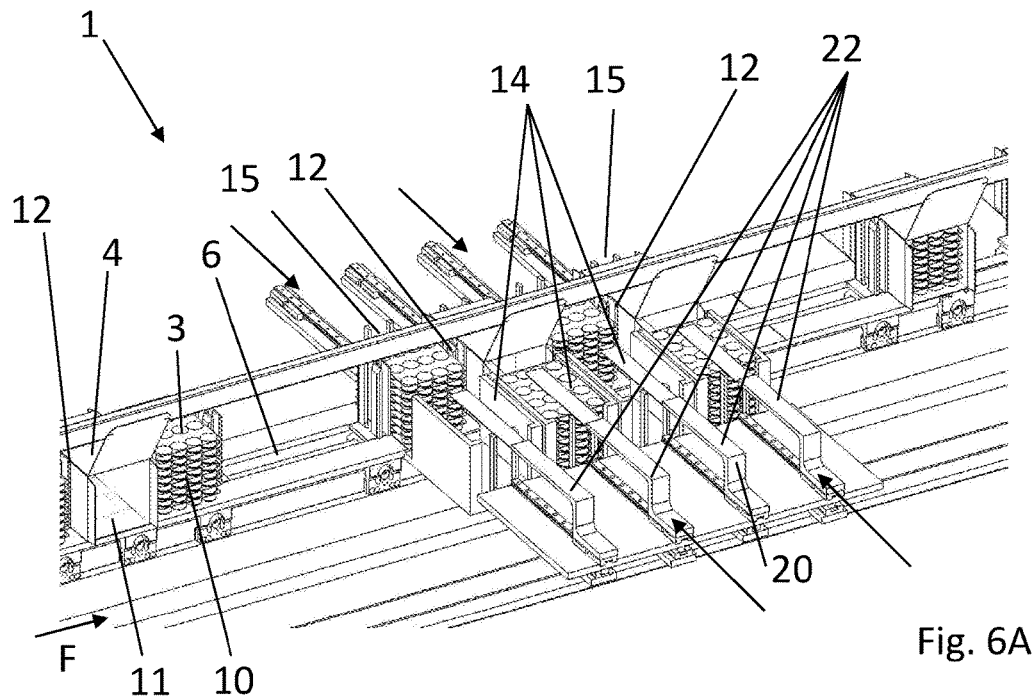
FIGS. 6A-6B are perspective views of a section of a transport device in which two phases of another exemplary embodiment of the method according to the present disclosure are illustrated.
Figure 6B:
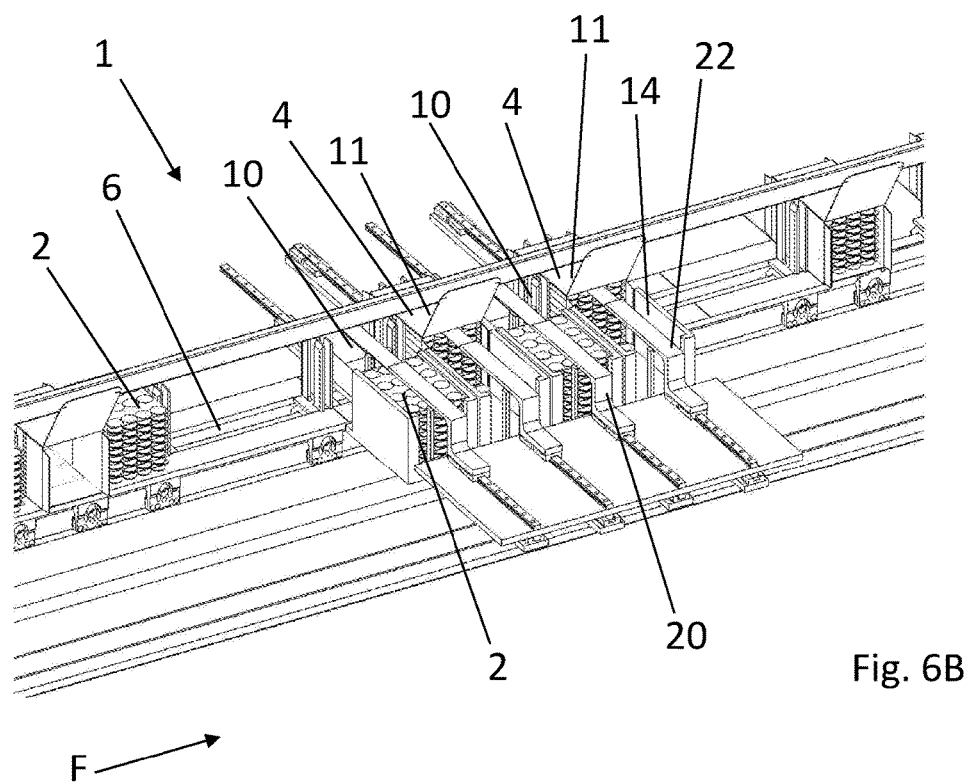

FIGS. 6A and 6B are perspective views of a section of a transport device 1 corresponding to the transport device 1 of FIG. 1 and of a transfer device 20 for transferring items to be packaged 2. Two phases of another exemplary embodiment of the method according to the invention are illustrated here.

The embodiment in FIGS. 6A and 6B is identical in terms of the principle of the method to the exemplary embodiment described on the basis of FIGS. 5A-5D. The phases of the method in FIGS. 6A and 6B correspond to the phases of the method in FIGS. 5A and 5B. In FIGS. 6A and 6B, the first and second groups 16, 18 each consist of four product holding spaces 10, 11; i.e., two first product holding spaces 10 for holding items to be packaged 2 and two second product holding spaces 11 for holding containers 4. The first and second product holding spaces 10, 11 alternate with each other in the conveying direction F.

In FIG. 6A, the first and second product holding spaces 10, 11 of the first group 16 are located in the transfer positions 15, next to the intermediate storage areas 14. The first and second product holding spaces 10, 11 of the first group 16 are supplied with two empty containers 4 and two stacks 3 of blister packs. Two stacks 3 of blister packs have already been positioned in the intermediate storage areas 14.

As can also be seen in FIGS. 6A and 6B, the four intermediate storage areas 14 are arranged in a row in the conveying direction F. The empty containers 4 are arranged on the transport device 1 next to the blister pack stacks 3 in the intermediate storage areas 14 in the direction transverse to the conveying direction F, wherein the open sides of the containers 4 are facing the blister pack stacks 3 in the intermediate storage areas 14. A transfer device 20, which comprises four pusher elements 22 overall, serves to push blister pack stacks 3 transversely in two opposite directions, i.e., transversely to the conveying direction F.

In FIG. 6B, the two blister pack stacks 3 have been pushed from the intermediate storage areas 14 by two pusher elements 22 in a second direction transverse to the conveying direction F onto the transport device 1 and into the containers 4 present there. Two blister pack stacks 3 have also been pushed from the first product holding spaces 10 by two other pusher elements 22 in a first direction, opposite to the second direction, into two intermediate storage areas 14.

In another phase, the product holding spaces 10, 11 of the first group 16 and the two containers 4 filled with items 2 and accommodated in the second product holding spaces 11 can be moved onward in the conveying direction F. In this case, the now-empty intermediate space between two filled product holding spaces 11 can be reduced if this is helpful in terms of further processing. After that, additional product holding spaces 10, 11 of a second group 18 can move up from behind into the transfer positions15.

In the embodiments of FIGS. 5A-5D and FIGS. 6A-6B, the number of product holding spaces 10, 11 of a group 16, 18 can be selected as desired. Nevertheless, it is advantageous for first product holding spaces 10 to alternate with second product holding spaces 11 and for the order of the product holding spaces 10, 11 of the one group 16 to be the reverse of the order to the holdings spaces of the following group 18.

It may also be especially preferable for the total number of product holding spaces 10, 11 to be even in each group 16, 18, which also means that the number of transfer positions 15 and intermediate storage areas 14 will also be even. In this way, the same number of filled containers can be produced in each group 16, 18 of product holding spaces 10, 11.

Of course, it is also possible to provide only first product holding spaces 10 in a first group 16 and only second product holding spaces 11 in a second group 18.

In FIGS. 6A and 6B, the transfer device 20 comprises a total of four pusher elements 22 for pushing the blister pack stacks 3 transversely, i.e., in directions transverse to the conveying direction F. The four pusher elements 22 are able to push the items to be packaged 2 in both directions transversely to the conveying direction F. It is also possible, however, to provide eight separate pusher elements 22 in the form of sliding plates, wherein four sliding plates are provided on the side of the transport device 1 and four more sliding plates are provided on the side of the intermediate storage areas 14.

In the embodiments shown in FIGS. 1 and 6, one retaining element 12 is assigned to each slide 8. The items to be packaged 2 or the containers 4 are held and transported in the product holding spaces 10, 11 between the retaining elements 12 of a pair or of a group of slides 8. In principle, n slides 8 in a row can define n-1 product holding spaces, if both sides of the retaining elements 12 of certain slides 8 are used. In another embodiment, not shown in the figures, at least three retaining elements can be assigned to each slide 8; that is, each slide 8, by itself, contains a least two product holding spaces 10, 11 and/or can cooperate with other slides 8 to form product holding spaces 10, 11.

A slide 8 can also, by itself, comprise a single product holding space 10, 11. In this case, only two slides instead of four would be required in the embodiment of FIGS. 3A-3D, for example.

The retaining elements 12 comprise in each case a vertical dimension. They can, for example, have the shape of an "I". In this case, the at least one item to be packaged 2 or the container 4 preferably rests on support surfaces on the slides 8, and only their sides are supported by the retaining elements 12. The retaining elements 12 can also be configured in the shape of an "L" or an inverted "T", wherein the legs of the L-shape or T-shape then also serve as support surfaces of the product holding space 10. Finally, the retaining elements 12 can also comprise inner support surfaces comprising curved sections. Only one side of a retaining element 12 can be used to hold an object, or both sides can be used. To this extent, a retaining element 12 can also be used to form two product holding spaces 10.

Many individual aspects of the basic scheme according to the present disclosure described so far can be modified as desired. For example, in all of the embodiments depicted, several product holding spaces 10, 11 can be filled simultaneously, emptied simultaneously, and/or transported simultaneously. Accordingly, several transfer positions 15 and intermediate storage areas 14 can also be present. Especially in the embodiments described on the basis of FIGS. 5 and 6, this can be useful as a way of increasing throughput. The number of product holding spaces 10, 11 and of slides 8 is variable in principle and is to be adapted to the concrete application.

In addition to the pushing movement, the items to be packaged 2 and the containers 4 could also be lifted to the intermediate storage area 14 and back again to the transport device 1 or moved in some other way. The pushing movement, however, has the advantage of simplicity of realization. In addition, package inserts (not shown), which are transported into position in the known manner, can also be introduced together with the items to be packaged 2 into the containers 4 by these pushing movements.

The length of the product holding spaces 10, 11 in the conveying direction F, that is, the distance between the pairs of retaining elements 12, is basically adjustable to suit the individual application. Different products require product holding spaces 10, 11 of different lengths. In addition, the product holding spaces 11 for containers 4 are usually to be made somewhat longer than the product holding spaces 10 for the items to be packaged 2. Finally, it can also be useful, as a way of facilitating the insertion of the items to be packaged 2 or of the containers 4 into product holding spaces 10, 11, to make these product holding spaces 10, 11 somewhat longer initially, and then, after the items to be packaged 2 or the containers 4 have been inserted, to decrease the length of the holding spaces again. The movement of the retaining elements 12 relative to each other is usually accomplished by the efficient actuation of the slides 8 by means of the linear motor drive device 7.

In this way, a highly flexible system is created, which covers all possible areas of application without the need to exchange format-dependent parts.

The invention claimed is:

1. A method for transferring at least one item to be packaged into containers, and for transporting the filled containers onward, comprising the steps of:
   providing a transport device having at least two slides, a guide rail along which the at least two slides are moved, and a linear motor drive device for driving the at least two slides, wherein each of the at least two slides comprises at least one permanent magnet, which interacts with the linear motor drive device;
   conveying at least one item to be packaged in a conveying direction to at least one transfer position by means of the transport device;
   moving the at least one item to be packaged from the at least one transfer position to at least one intermediate storage area, which is arranged next to the transport device;
   conveying at least one container in the conveying direction to the at least one transfer position by means of the transport device;
   moving the at least one item to be packaged back from the at least one intermediate storage area to the transport device, thus filling the at least one container with the at least one item to be packaged; and
   transporting the at least one filled container onward in the conveying direction by means of the transport device.

2. The method according to claim 1, wherein the at least one item to be packaged and the at least one container are transported in at least one first and at least one second product holding space of the transport device.

3. The method according to claim 2, wherein the at least one first product holding space for transporting the at least one item to be packaged comprises a first length, and the at least one second product holding space for transporting the at least one container comprises a second length, which is greater than the first length.

4. The method according to claim 3, wherein the at least one item to be packaged is first transported in the at least one first product holding space to the at least one transfer position, and after the at least one item to be packaged has been moved to the at least one intermediate storage area, the at least one item to be packaged is moved to the at least one second product holding space and thus into the at least one container.

5. The method according to claim 2, wherein each of the at least one first and the at least one second product holding space is formed between two retaining elements.

6. The method according to claim 5, wherein the two retaining elements of each at least one first and at least one second product holding space are shifted relative to each other by an interaction of at least one permanent magnet with the linear motor drive device.

7. The method according to claim 5, wherein the transport device comprises at least one first, at least one second, and at least one third slide, on each of which one of the retaining elements is arranged, wherein the retaining element of the second slide contributes to a formation of the at least one first and to a formation of the at least one second product holding space.

8. The method according to claim 2, wherein the at least one first and the at least one second product holding space are transported in groups.

9. The method according to claim 8, wherein several first and several second product holding spaces are provided in each group of product holding spaces, wherein, in each group, first product holding spaces alternate in the conveying direction with second product holding spaces.

10. The method according to claim 9, wherein a number of first product holding spaces and a number of second product holding spaces in each group are even.

11. The method according to claim 1, wherein moving of the at least one item to be packaged from the transport device to the at least one intermediate storage area is achieved by pushing the at least one item to be packaged in a first direction transverse to the conveying direction.

12. The method according to claim 11, wherein filling of the at least one container with the at least one item to be packaged is achieved by pushing the at least one item to be packaged into the at least one container in a second direction opposite to the first direction.

* * * * *